United States Patent
Gunderson, III

(10) Patent No.: US 6,857,819 B2
(45) Date of Patent: Feb. 22, 2005

(54) ATTACHMENT FOR USE WITH STOCKPILING BARGE AND METHOD OF FILTERING RUNOFF WATER THEREFROM

(75) Inventor: William F. Gunderson, III, Astoria, OR (US)

(73) Assignee: Gunderboom, Inc., Anchorage, AK (US)

( * ) Notice: Subject to any disclaimer, the term of this patent is extended or adjusted under 35 U.S.C. 154(b) by 0 days.

(21) Appl. No.: 10/358,424

(22) Filed: Feb. 4, 2003

(65) Prior Publication Data

US 2003/0152425 A1 Aug. 14, 2003

Related U.S. Application Data

(60) Provisional application No. 60/354,107, filed on Feb. 4, 2002.

(51) Int. Cl.[7] .............................................. E02B 15/00
(52) U.S. Cl. ........................... 405/60; 210/460; 114/27
(58) Field of Search .............................. 405/40, 41, 39, 405/60; 210/460, 237, 238, 317, 314, 316, 318, 242.1; 114/26–38, 73

(56) References Cited

U.S. PATENT DOCUMENTS

| | | | |
|---|---|---|---|
| 629,578 A | | 7/1899 | Maginn |
| 861,028 A | | 7/1907 | Grote |
| 3,659,713 A | | 5/1972 | Mueller |
| 3,713,540 A | | 1/1973 | Davidson et al. |
| 3,744,254 A | | 7/1973 | Fennelly |
| 3,762,562 A | * | 10/1973 | Okuniewski et al. ....... 210/460 |
| 3,862,502 A | * | 1/1975 | Young .......................... 37/316 |
| 3,899,424 A | | 8/1975 | Lake |
| 3,979,289 A | | 9/1976 | Bykowski et al. |
| 4,178,245 A | | 12/1979 | Nakaoka et al. |
| 4,219,423 A | | 8/1980 | Smith, Jr. |
| 4,288,321 A | | 9/1981 | Beane |
| 4,296,884 A | | 10/1981 | Luebke |
| 4,335,977 A | | 6/1982 | Ihli |
| 4,419,232 A | | 12/1983 | Arntyr et al. |
| 4,582,048 A | | 4/1986 | Sorensen |
| 4,738,563 A | | 4/1988 | Clark |
| 4,749,479 A | | 6/1988 | Gray |
| 4,769,052 A | * | 9/1988 | Kowalski ...................... 55/379 |
| 4,822,106 A | * | 4/1989 | Wilson et al. ................ 37/314 |
| 4,880,333 A | | 11/1989 | Glasser et al. |
| 4,919,820 A | | 4/1990 | Lafay et al. |
| 5,089,108 A | * | 2/1992 | Small ......................... 210/460 |
| 5,102,261 A | | 4/1992 | Gunderson, III |
| 5,139,686 A | | 8/1992 | Cares |
| 5,197,821 A | | 3/1993 | Cain et al. |
| 5,220,958 A | | 6/1993 | Bernhardt |
| 5,322,629 A | | 6/1994 | Stewart |

(List continued on next page.)

FOREIGN PATENT DOCUMENTS

| | | |
|---|---|---|
| FR | 2195-238 | 8/1972 |
| FR | 2284-709 | 9/1974 |
| FR | 2329-808 | 11/1975 |
| FR | 2579-239 A | 3/1985 |
| WO | WO 91/07546 | 5/1991 |
| WO | WO 99/19570 | 4/1999 |

*Primary Examiner*—Frederick L. Lagman
(74) *Attorney, Agent, or Firm*—Nixon Peabody LLP

(57) ABSTRACT

An attachment to a drainage hose for use on a stockpiling barge that includes: a fluid pervious bag formed of a flexible fabric material, the fluid pervious bag having an open end and a closed end, a ballast material attached to or retained within the closed end of the fluid pervious bag, and means for securing the open end of the fluid pervious bag about a hose. Also disclosed are the attachment in combination with a drainage hose and a stockpiling barge, a method of filtering runoff water from a stockpiling barge through the use of the attachments, and a method of preventing non-dissolved organic or inorganic contaminants from flowing from a stockpiling barge into a body of water through the use of the attachments.

20 Claims, 4 Drawing Sheets

U.S. PATENT DOCUMENTS

| | | |
|---|---|---|
| 5,345,741 A | 9/1994 | Slater et al. |
| 5,354,456 A | 10/1994 | Montgomery et al. |
| 5,354,459 A | 10/1994 | Smith |
| 5,372,711 A | 12/1994 | Sill |
| 5,427,679 A | 6/1995 | Daniels |
| 5,893,978 A | 4/1999 | Yoda et al. |
| 6,210,573 B1 * | 4/2001 | Marshall ..................... 210/238 |
| 6,337,025 B1 | 1/2002 | Clemenson |

* cited by examiner

ATTACHMENT FOR USE WITH STOCKPILING BARGE AND METHOD OF FILTERING RUNOFF WATER THEREFROM

The present application is entitled to the priority benefit of U.S. Provisional Patent Application Ser. No. 60/354,107 filed Feb. 4, 2002, which is hereby incorporated by reference in its entirety.

FIELD OF THE INVENTION

The present invention relates generally to water filtration systems designed for use in aquatic environments, particularly for use in dredging operations to filter runoff water entering the aquatic environment from a stockpiling barge.

BACKGROUND OF THE INVENTION

Dredging operations are routinely carried out in many water ways where access to a port site is desired. The dredging allows for removal of sedimentation from within a body of water such that the depth of the water column is sufficient for ingress and egress of vessels. However, dredging operations can cause significant harm to the aquatic environment, particularly where sediment is known to be contaminated with heavy metals such as mercury or organic contaminants such as polychlorinated biphenyls.

Resuspension of sediment, whether contaminated or not, into the water column and surrounding environment is always a concern for dredging operations. Resuspension can occur during two phases of the dredging operation, either from the removal activity or from the runoff of water from the stockpiling barge. To minimize the effect of resuspension during the removal activity, the dredging site can be surrounded by aquatic barriers of the type disclosed in U.S. Pat. No. 5,102,261 to Gunderson III or U.S. Pat. No. 6,485,229 to Gunderson III, et al. However, this typically is insufficient for the stockpiling barges, which must be moved to and from the dredging site and, therefore, cannot easily be contained by such barriers.

Stockpiling barges must release excess water during dredging. This is achieved via drainage holes spaced about the perimeter of the barge, typically at the four corners and possibly along the sides. Traditionally, dredgers allow the water runoff to pass through the drainage holes and then spill over the side of the barge. Not only does this add to water turbidity, but it also allows the possibility of contaminated sediments re-entering the water column.

The present invention is directed to overcoming these deficiencies in the art.

SUMMARY OF THE INVENTION

A first aspect of the present invention relates to an attachment to a drainage hose for use on a stockpiling barge. The attachment includes: a fluid pervious bag formed of a flexible fabric material, the fluid pervious bag having an open end and a closed end, a ballast material attached to or retained within the closed end of the fluid pervious bag, and means for securing the open end of the fluid pervious bag about a hose.

A second aspect of the present invention relates to the combination of a drainage hose, having a first end adapted for connection to a drainage outlet of a stockpiling barge and a second end, and the attachment according to the first aspect of the present invention, with the attachment being secured to the drainage hose by the means for securing, with the second end of the drainage hose positioned internally of the fluid pervious bag.

A third aspect of the present invention relates to the combination of a stockpiling barge that is designed to receive dredged materials and includes one or more drainage outlets, one or more drainage hoses each having a first end coupled in fluid communication to a corresponding drainage outlet and a second end, and one or more attachments according to the first aspect of the present invention, with each attachment being secured to a corresponding drainage hose by the means for securing, with the second end of the drainage hose positioned internally of the fluid pervious bag.

A fourth aspect of the present invention relates to a method of filtering water flowing from a stockpiling barge that includes: providing a stockpiling barge that is designed to receive dredged materials and includes one or more drainage outlets, one or more drainage hoses each having a first end coupled in fluid communication to a corresponding drainage outlet and a second end, and one or more attachments according to the first aspect of the present invention, with each of the attachments being secured to a corresponding drainage hose by the means for securing, with the second end of the drainage hose positioned internally of the fluid pervious bag; and introducing dredged materials into the stockpiling barge, wherein water and sedimentation flowing from the stockpiling barge through the one or more drainage outlets passes into the corresponding attachment, whereby sedimentation flowing through the drainage outlet is retained within the corresponding attachment while water passes freely through the flexible material that forms the fluid pervious bag.

A fifth aspect of the present invention relates to a method of preventing non-dissolved organic or inorganic contaminants from flowing from a stockpiling barge into a body of water. This method includes: performing the method according to the fourth aspect of the present invention, wherein the dredged materials further contain non-dissolved organic or inorganic contaminants, whereby non-dissolved organic or inorganic contaminants flowing through the drainage outlet are retained within the corresponding attachment while water passes freely through the flexible material that forms the fluid pervious bag.

Because the fluid pervious bag allows for capture of sediment particles that are larger than the pores of the flexible fabric material, a large portion of sediment that normally would flow back into the aquatic environment surrounding a dredge site can be contained and removed. Not only does this minimize environmental harm at the site, particularly where contaminants are present in the sediments, but this also facilitates a substantial reduction in turbidity at the site. An approximately 10- to 100-fold reduction in turbidity caused by barge runoff can be achieved. The decrease in turbidity will allow for greater ease and efficiency in carrying out the dredging operation and, as a result, likely afford decreased dredging costs. Additional benefits include the potential removal or partial removal of hydrocarbons in the dredge spoils runoff via absorption into the flexible fabric material used to form the fluid pervious bag. Preferred oleophilic non-woven geotextiles, when used, and with the appropriate retention time, will absorb hydrocarbons.

DETAILED DESCRIPTION OF THE INVENTION

Figure 1:
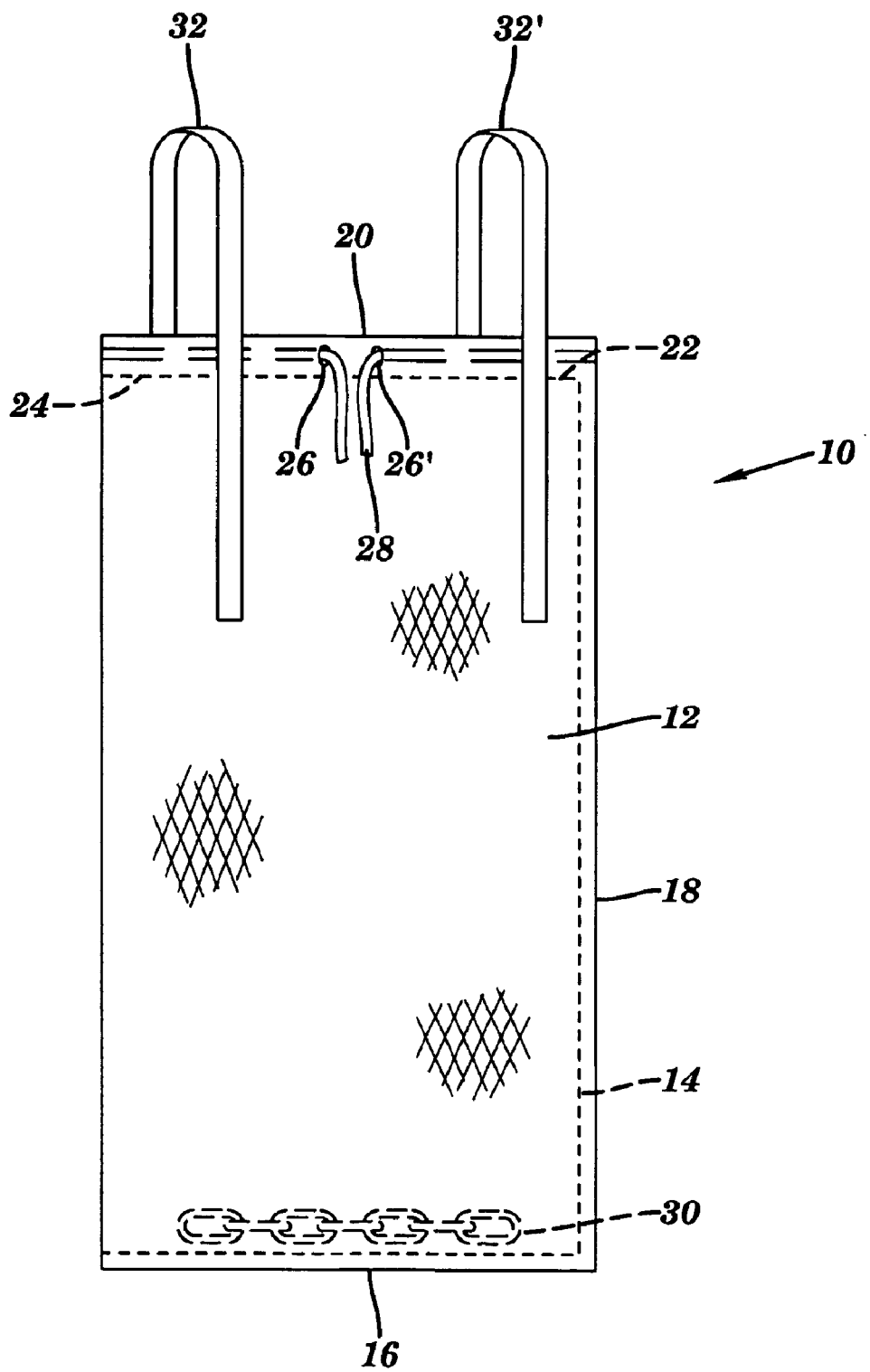
FIG. 1 is an elevational view of an attachment to a drainage hose in accordance with a first embodiment of the present invention.

The present invention relates to an attachment to a drainage hose for use on a stockpiling barge, the combination of the attachment and drainage hose, as well as the combination of the attachment, drainage hose, and stockpiling barge.

The attachments are in the form of a fluid pervious bag that is formed of a flexible fabric material. The fluid pervious bag can have any of a variety of shapes or configurations, but all of the embodiments are characterized by an open end, which is intended to receive the discharge hose, and a closed end opposite therefrom. The dimensions of the fluid pervious bag should be suitable for the site, i.e., not longer than the depth of the water column where dredging occurs. An exemplary dimension of the fluid pervious bag is about 2 feet wide and about 10 feet long.

The flexible fabric material that is used to form the fluid pervious bag can be any suitable fabric material that is sufficiently durable to handle the stresses of containing dredge sediments, particularly during removal of filled attachments from the water (described hereinafter). To achieve containment of sediments, the flexible fabric material preferably has an average pore size that is less than about 150 microns, more preferably between about 10 and about 80 microns, most preferably between about 10 and about 30 microns. The nature of the sediment to be dredged (i.e., silt, clay, sand, etc.) will dictate the appropriate pore size of the flexible fabric material.

Preferred flexible fabric materials are geosynthetic fabrics. Geosynthetic fabrics are formed of polymeric materials and can be either woven or non-woven. The geosynthetic fabric is "water-pervious," meaning that water passes through the fabric and is not absorbed by the fabric.

Typically, the geosynthetic fabric will also be "oleophilic," meaning that it absorbs or attracts oil (more generally, hydrocarbons), thereby blocking the flow of oil, but allows water to flow therethrough. For containment of silt and other suspended particulates, it is not essential that the fluid pervious bag be oleophilic. However, many pollutants are hydrocarbon-based and to contain those pollutants, the fluid pervious bag preferably is oleophilic.

Useful geosynthetic fabrics are further characterized by high load distribution capacity, the ability to abate material filtration, and permeability to water. Geosynthetic fabrics are commercially available in a range of tensile strengths, permeabilities, and permittivities, and are useful for the purposes of the invention throughout those ranges.

The geosynthetic fabrics are nonbiodegradable, so they do not deteriorate due to environmental exposure. During prolonged use, exposure to ultraviolet (UV) light may cause some geosynthetic fabrics to weaken or deteriorate. However, UV-resistant fabrics are commercially available as well as UV resistance treatment methods.

Geosynthetic fabric may be prepared using one or a combination of various polymers, for example polyester, polypropylene, polyamides, and polyethylene. Most commercially available geosynthetic fabrics are polypropylene or polyester. Examples of suitable nonwoven geosynthetic fabrics include, but are not limited to, AMOPAVE® 4399, AMOPAVE® HD 4597, 4545, 4553, and 4561 (all polypropylene fabrics commercially available from Amoco Fabrics and Fibers Company); Typar®, a polypropylene fabric commercially available from Dupont; TREVIRA® Spunbond, a polyester fabric commercially available from Hoechst Fibers Industries. Examples of suitable woven geosynthetic fabrics include, but are not limited to, 1380 SILT STOP®, 1198, 1199, 2090, 2000, 2006 (all polypropylene fabrics commercially available from Amoco Fabrics and Fibers Company).

The fluid pervious bag can be constructed from the flexible fabric material by simply preparing sewn, heat fused, or sonically welded seams along the sides and/or ends thereof, thereby forming the open and closed ends of the fluid pervious bag. Other means of connecting the flexible fabric material to itself can also be employed.

The fluid pervious bag can be formed of a single layer of flexible fabric material or multiple layers of flexible fabric material. Where multiple layers are employed, the layers can be formed of the same or different flexible fabric material. For example, and without limitation, an inner layer can be formed of a first flexible fabric material having a particular pore size while an outer layer can be formed of a second flexible fabric material having a smaller pore size that will allow for retention of sediments that pass through the pores of the first or inner flexible fabric material. Alternatively, the layers of flexible fabric material can have different properties other than their pore size, such as an inner layer that is not oleophilic but an outer layer than is oleophilic, an inner layer that is woven and an outer layer than is non-woven, or vice versa. Various combinations can be utilized without departing from the scope of the present invention.

The attachments may further include ballast material that is attached to or retained within the fluid pervious bag. Basically, the ballast is attached to the closed end of the fluid pervious bag such that when installed onto a drainage hose of a stockpiling barge, the closed end is weighted down into the body of water.

Any suitable ballast material can be used for purposes of weighing down the closed end of the fluid pervious bag. Exemplary types of ballast include, without limitation, lengths of steel chain (from less than ⅛ inch to over ¾ inch) and steel cable (from less than ¾ inch to over 1½ inches in diameter). Chains and cables of greater or lesser diameter may be used to meet the specific requirements of a project design. To secure the ballast internally of or externally of the fluid pervious bag, wire ties, plastic ties, quick-release couplers, or any other suitable means can be used.

The attachments may further include, either as an integrally connected component or as a separable component, means for securing the open end of the fluid pervious bag about a drainage hose. The means for securing can include, without limitation: ropes, straps, or other forms of lashing; and clamps of various types, such as spring-biased clamps and adjustable ring clamps. Regardless of the type of securing means employed, the securing means should be sufficient to prevent water from flowing through the open end of the fluid pervious bag. That is, the open end should be secured about the drainage hose in a manner whereby substantially all fluid entering the fluid pervious bag from the drainage hose will exit the fluid pervious bag through its flexible fabric material rather than the open end (when secured to the drainage hose).

The attachments may further include one or more straps connected to the fluid pervious bag adjacent to the open end thereof. The one or more straps are intended to be coupled to support wires that will take any load off of the connections between the drainage hose and the drainage holes (on the barge) and between the drainage hose and the attachment. The one or more straps are preferably nylon straps of sufficient dimension and durability to accommodate the loads applied thereto. Connection between the straps and the flexible fabric material used to form the fluid pervious bag is preferably made by stitching, although other forms of connection, such as heat fusion or sonic welding can be utilized.

Figure 2:
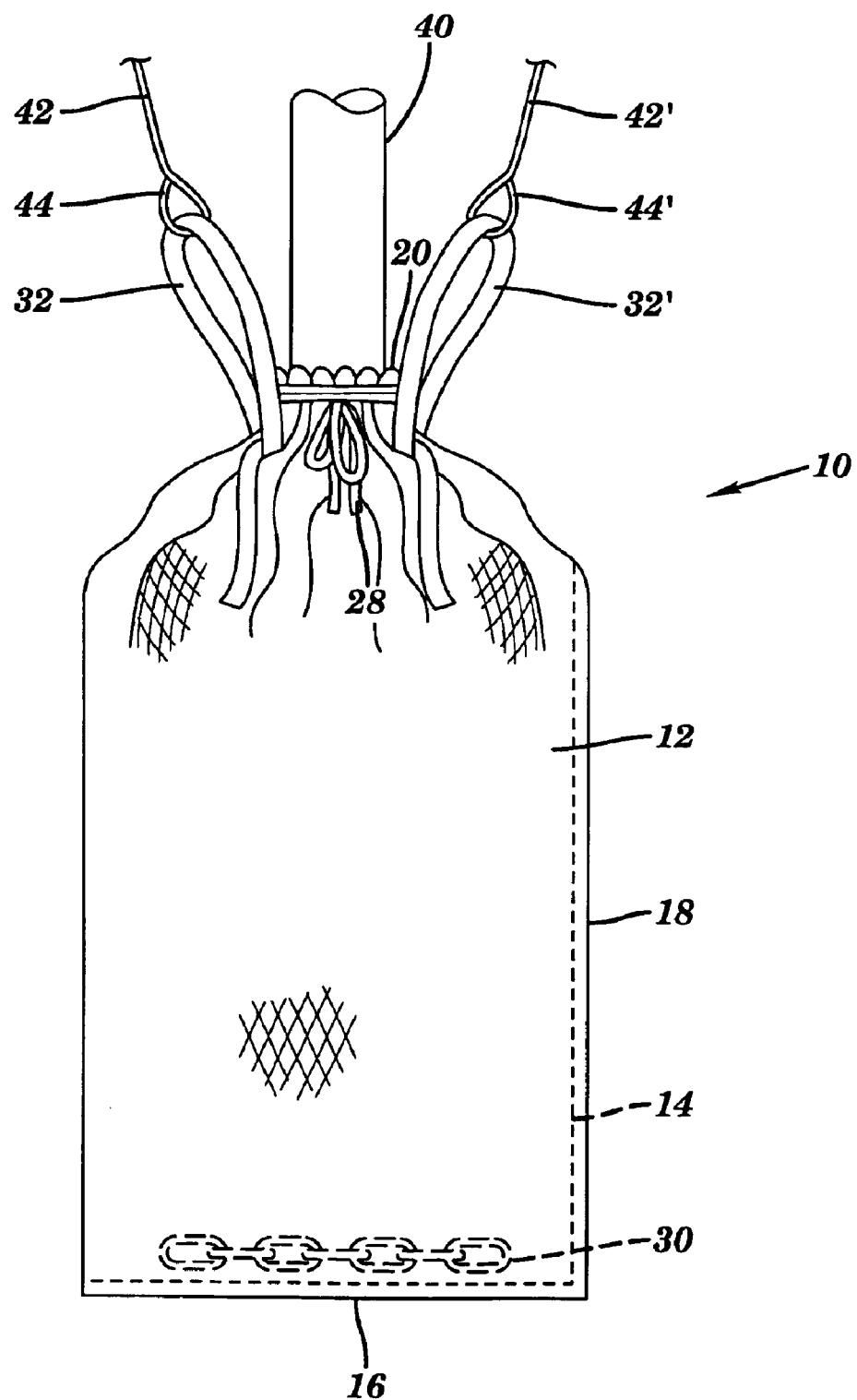
FIG. 2 is an elevational view of the attachment of the first embodiment shown connected to a drainage hose.

Referring now to FIGS. 1 and 2, an attachment 10 according to a first embodiment of the present invention is illustrated. The attachment 10 includes a fluid pervious bag 12 that is formed of a geosynthetic material of the type described above. The bag 12 is constructed by folding a rectangular sheet onto itself and simply preparing a sewn seam 14 along one end 16 (forming the closed end) and the lengthwise side 18. At the open end 20, a channel 22 is formed by an annular sewn seam 24. Using either a single opening or, as shown, a pair of openings 26,26', a cord 28 is provided within channel 22 such that its ends extend respectively from the openings 26,26'. The attachment 10 also includes a ballast 30 (in the form of a length of chain) that is shown resting in the fluid pervious bag 12 at its closed end 16, and a pair of straps 32,32' that are connected to the geosynthetic material via a sewn connection.

In use, shown in FIG. 2, the attachment 10 is connected to the end of a drainage hose 40. With its open end 20 placed over the end of the drainage hose 40, such that the end of the drainage hose is positioned internally of the bag 12, the ends of the cord 28 are drawn around the drainage hose 40 so as to cinch the open end 20 tightly against the surface of the drainage hose. The end of the cord 28 can be tied together to maintain the connection between the bag 12 and the drainage hose 40. The straps 32,32' are shown connected to cables 42,42' via quick-release couplers 44,44'.

The drainage hose 40 can be solid or flexible hose, but preferably flexible hose. The diameter of the hose will likely depend on the expected flow parameters, although a 4 inch diameter hose is likely to be sufficient in most situations.

Figure 3:
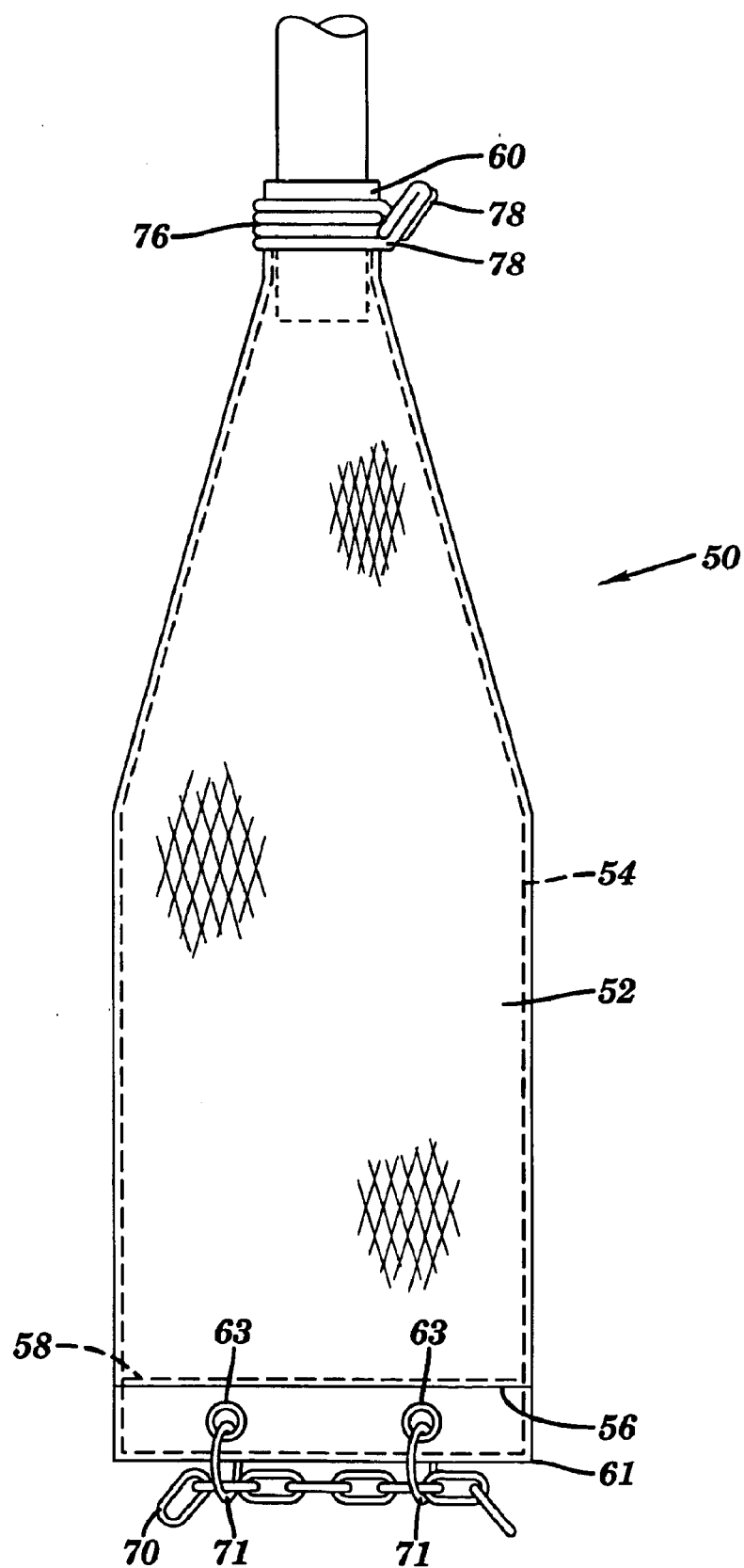
FIG. 3 is an elevational view of an attachment to a drainage hose in accordance with a second embodiment of the present invention.

Referring now to FIG. 3, an attachment 50 according to a second embodiment of the present invention is illustrated. The attachment 50 includes a fluid pervious bag 52 that is formed of a geosynthetic material of the type described above. The bag 52 has a closed end 56 and an open end 60, with the bag being tapered from approximately its midpoint toward its open end 60. By tapering the bag 52, it is possible to equip the bag with an open end 60 that is sized and configured to receive a discharge hose with little excess material. The bag 52 is constructed, for example, by joining together two similarly shaped pieces of geosynthetic material along sewn seams 54 about its entire perimeter except for its open end 60.

At its closed end 56, the bag 52 is provided with a tab or flap of material 61, formed by a seam 58, that includes a pair of grommets 63 that pass therethrough. The attachment 50 also includes a ballast 70 (in the form of a length of chain) that is connected to the bag 52 by connectors 71 of the type described above, which pass through the grommets 63.

The attachment 50 is connected to the end of a drainage hose 40 with its open end 60 placed over the end of the drainage hose 40 and a spring-biased clamp 76 providing sufficient constrictive force against the portion of the bag 52 that overlies the hose 40. As shown, the spring biased clamp 76 is a coil-type clamp having a pair of grips or handles 78 that allow a user to adjust the inner diameter of the clamp. The clamp 76 normally has a diameter that is slightly smaller than the diameter of the hose 40 and, upon manipulating the grips the user can enlarge the diameter to allow for its placement over the hose 40 and bag 52. After proper placement of the clamp, the grips are released, reducing the diameter of the clamp 76 to the point where the clamp constricts against the portion of the bag 52 overlying the hose 40. Although not shown in this embodiment, it should be appreciated that bag 52 can also be provided with straps that can engage cables as shown in FIG. 2; such straps and cables will be necessary only when the spring clamp is unable to provide sufficient constrictive force to prevent uncoupling of the bag/hose connection during use.

Figure 4:
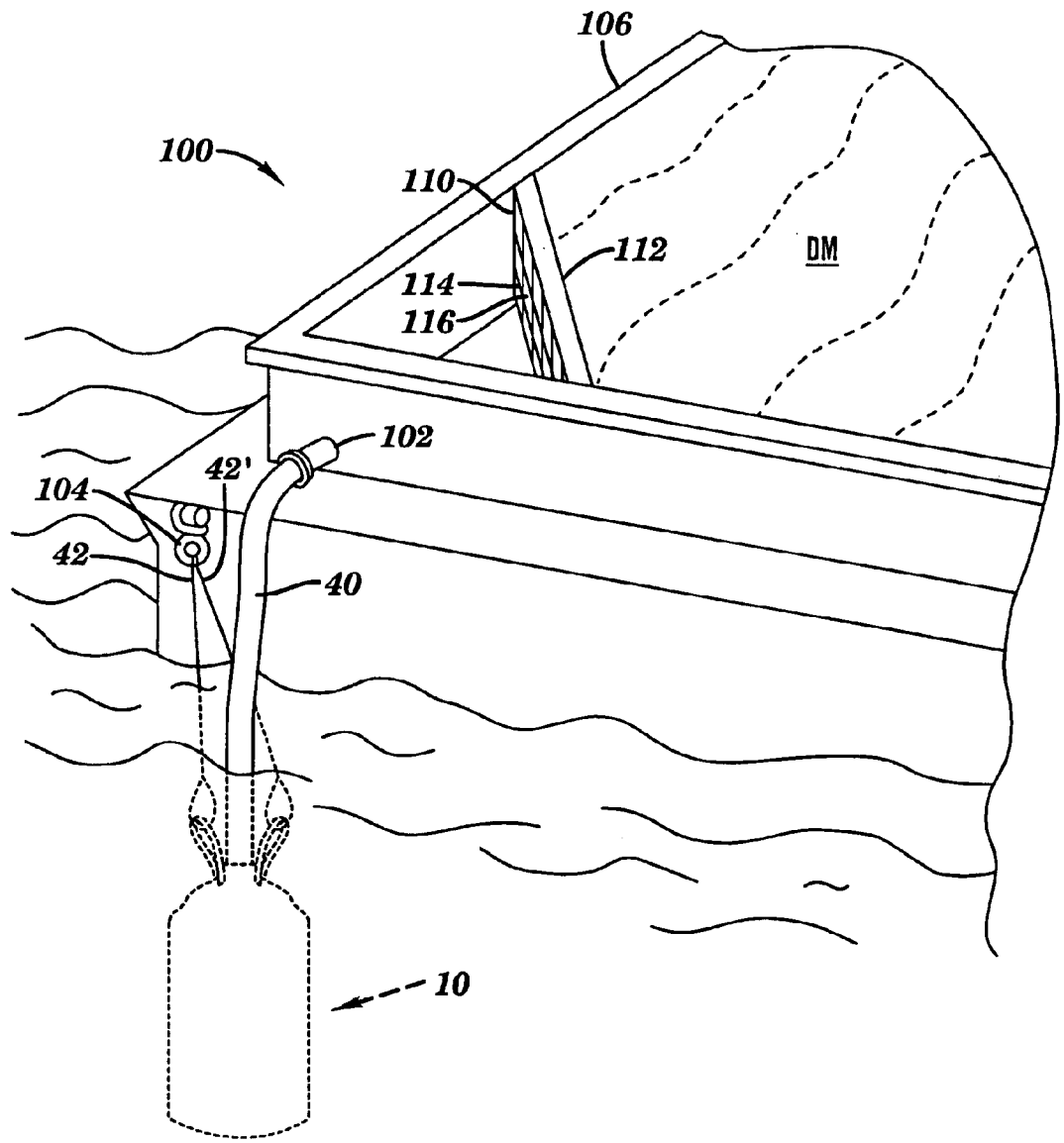
FIG. 4 is a partial perspective view of a stockpiling barge in combination with a drainage hose and attachment according to the first embodiment of the present invention.

Referring now to FIG. 4, an attachment of the present invention, e.g., attachment 10, is shown installed on one end of a discharge hose 40 whose opposite end is connected to a drainage outlet 102 present at one corner of a stockpiling barge 100. Although only one corner of the stockpiling barge is illustrated, it should be appreciated that such a stockpiling barge will typically include two or more outlets and, more typically, four or more outlets (i.e., one at each corner of the barge). The stockpiling barge 100 is also equipped with cleats or rings 104 to which are attached the ends of cables 42,42'. The stockpiling barge 100 also includes a bulwark 106 about the perimeter of the barge to contain the dredged materials DM removed from the body of water. To prevent clogging of the drainage outlet 102, a framed filter 110 is provided at a position spaced from the outlet.

The framed filter 110 includes a rigid frame 112 secured to the inner sides of the bulwark 106, a semi-rigid mesh screen 114 formed of, e.g., metal or thermoplastic materials, and a sheet 116 of fluid-pervious flexible fabric material of the type described above. The mesh screen 114 and the sheet of flexible fabric material 116 are contiguous over substantially the entire surface area of the filter 110. The screen 114 is shown positioned proximal to the outlet 102 and the sheet 116 positioned distal to the outlet 102, whereby the screen 114 effectively supports the sheet 116 against the forces applied by the mass of dredged materials DM. The geosynthetic fabric material that forms the sheet 116 preferably has an average pore size of about 100 to about 150 microns, which is usually sufficient to retain larger sediment while allowing fluids and fine sediment to pass therethrough.

In use, a crane barge will remove dredge materials (including sediment and water) from the body of water and place the dredged materials DM onto the stockpiling barge 100, specifically within the region defined by the bulwark 106. As the dredged materials DM remain on the stockpiling barge 100, water and sediment will flow toward the drainage outlets 102. The flow will first pass through the framed filter 110, which allows only fluids and sediments finer that its pore size to pass therethrough. The modified flow of fluid and sediments continues through the respective drainage outlet 102 and into discharge hose 40, which carries the flow into the region internal of the fluid pervious bag 12. While most sediments are retained within the internal region of the fluid pervious bag 12, water and only a small percentage of the fine dredge materials (that are smaller than the pore size) pass through the flexible fabric material that forms the bag 12.

Once a bag 12 becomes substantially or completely filled with retained sediments, the attachment 10 and drainage hose 40 can be brought onto the deck of the stockpiling barge 100 (e.g., by a crane) so that the means for securing can be removed and a new attachment 10 placed onto the end of the drainage hose 40.

By virtue of controlling the flow of sediments from the barge runoff, it is possible to control not only sediments per se, but also organic and inorganic materials that are not dissolved in the runoff water. Exemplary organic contaminants, include, without limitation, PCBs, pesticides, tributyl-tin, polyaromatic hydrocarbons. Inorganic materials include, without limitation, heavy metals. By controlling or preventing the flow of organic and inorganic contaminants back in to the water, it is intended to reduce the concentration of such contaminants that would, but for the attachment of the present invention, flow with the runoff water back into a body of water.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An attachment to a drainage hose for use on a stockpiling barge, the attachment comprising:
   a fluid pervious bag formed of a geosynthetic fabric material, the fluid pervious bag having an open end and a closed end,
   a ballast material attached to or retained within the closed end of the fluid pervious bag, and
   means for securing the open end of the fluid pervious bag about a drainage hose.

2. The attachment according to claim 1, wherein the ballast material is attached to the closed end externally of the fluid pervious bag.

3. The attachment according to claim 1, wherein the ballast material is attached to the closed end internally of the fluid pervious bag.

4. The attachment according to claim 1, wherein the ballast material is retained within the fluid pervious bag.

5. The attachment according to claim 1, wherein the ballast material is in the form of a chain.

6. The attachment according to claim 1, wherein the fluid pervious bag includes a channel formed by the geosynthetic fabric material about the open end, the channel including first and second openings.

7. The attachment according to claim 1, wherein the means for securing comprise a rope located with the channel, the rope including first and second ends which extend from, respectively, the first and second openings of the channel.

8. The attachment according to claim 1 further comprising:
   one or more straps secured to the fluid pervious bag adjacent the open end.

9. The attachment according to claim 1 wherein the means for securing comprise a clamp that surrounds the open end.

10. The attachment according to claim 9, wherein the clamp is a spring-biased clamp.

11. The attachment according to claim 1 wherein the fluid pervious bag tapers from the closed end toward to open end.

12. In combination,
   a drainage hose having a first end adapted for connection to a drainage outlet of a stockpiling barge and a second end; and
   the attachment of claim 1 secured to the drainage hose by the means for securing, with the second end of the drainage hose positioned internally of the fluid pervious bag.

13. In combination,
   a stockpiling barge designed to receive dredged materials, the stockpiling barge including one or more drainage outlets;
   one or more drainage hoses each having a first end coupled in fluid communication to a corresponding drainage outlet and a second end; and
   one or more attachments according to claim 1 each secured to a corresponding drainage hose by the means for securing, with the second end of the drainage hose positioned internally of the fluid pervious bag.

14. The combination according to claim 13, wherein the stockpiling barge includes two or more drainage outlets, two or more drainage hoses, and two or more attachments.

15. The combination according to claim 13, wherein the stockpiling barge further includes one or more filters positioned, respectively, between the portion of the stockpiling barge designed to receive dredged materials and the one or more outlets.

16. The combination according to claim 15, wherein the one or more filters each comprise a frame, a mesh screen secured to the frame, and a sheet of flexible fabric material secured to the frame, wherein the mesh screen and the sheet of flexible fabric material are contiguous over substantially the entire surface area of the filter.

17. A method of filtering water flowing from a stockpiling barge comprising:
   providing a stockpiling barge that is designed to receive dredged materials and includes one or more drainage outlets, one or more drainage hoses each having a first end coupled in fluid communication to a corresponding drainage outlet and a second end, and one or more attachments according to claim 1 each secured to a corresponding drainage hose by the means for securing, with the second end of the drainage hose positioned internally of the fluid pervious bag; and
   introducing dredged materials into the stockpiling barge, wherein water and sedimentation flowing from the stockpiling barge through the one or more drainage outlets passes into the corresponding attachment, whereby sedimentation flowing through the drainage outlet is retained within the corresponding attachment while water passes freely through the geosynthetic fabric material that forms the fluid pervious bag.

18. A method of preventing non-dissolved organic or inorganic contaminants from flowing from a stockpiling barge into a body of water comprising:
   performing the method according to claim 17, wherein the dredged materials further contain non-dissolved organic or inorganic contaminants, whereby non-dissolved organic or inorganic contaminants flowing through the drainage outlet are retained within the corresponding attachment while water passes freely through the geosynthetic fabric material that forms the fluid pervious bag.

19. The attachment according to claim 1 wherein the geosynthetic fabric material has a pore size that is less than about 150 microns.

20. The attachment according to claim 1 wherein the geosynthetic fabric material has a pore size that is between about 10 and about 80 microns.

* * * * *